Feb. 10, 1953          A. BUNCE          2,628,140
DETACHABLE SHELF FOR INSTRUMENT BOARDS OF AUTOMOBILES
Filed Nov. 1, 1949
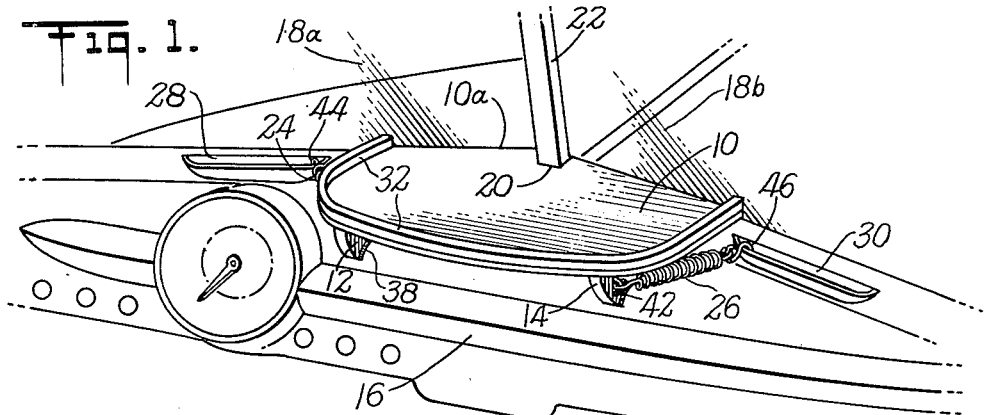
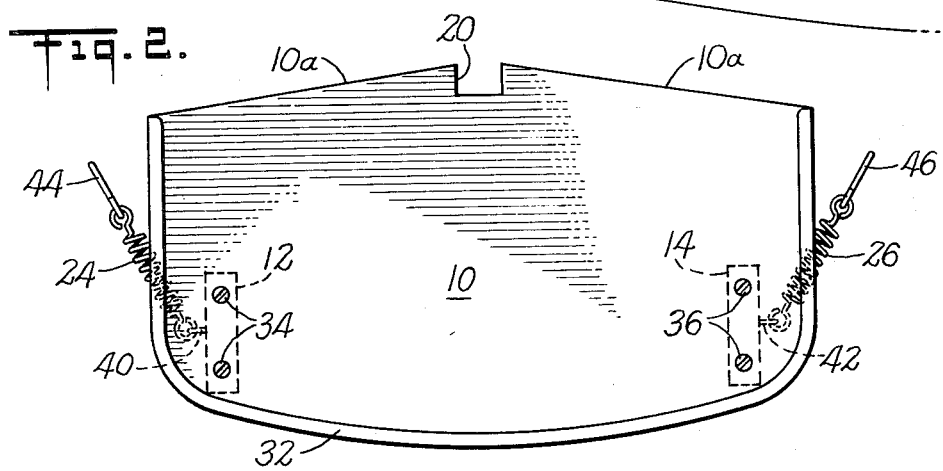
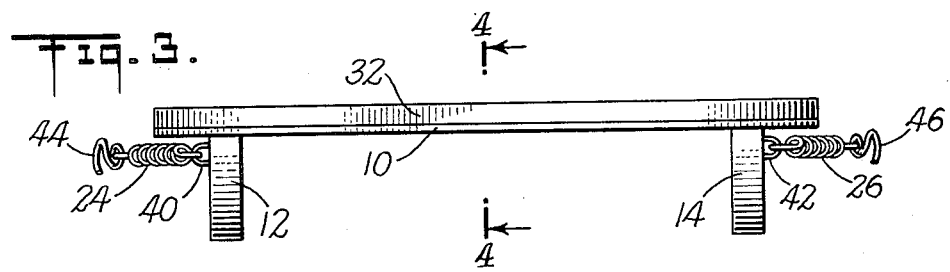
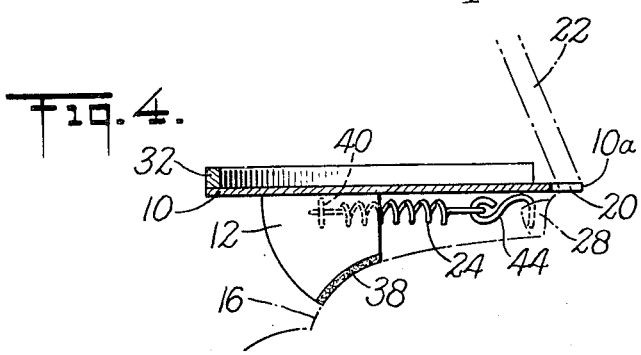
INVENTOR
*Alan Bunce*
BY
*Blair + Black*
ATTORNEYS Patented Feb. 10, 1953

2,628,140

UNITED STATES PATENT OFFICE 2,628,140

DETACHABLE SHELF FOR INSTRUMENT BOARDS OF AUTOMOBILES

Alan Bunce, Stamford, Conn.

Application November 1, 1949, Serial No. 124,740

4 Claims. (Cl. 311—21)

This invention relates to shelves and more particularly to shelves which are detachably mounted on the instrument board of an automobile.

Briefly, the shelf, generally indicated at 10, has a pair of legs 12 and 14 secured to its under-surface. Legs 12 and 14 support the rear portion of shelf 10 and have their lower ends shaped to fit the upper surface of the instrument board 16. The forward edge of shelf 10 is shaped to fit the two sections 18a and 18b of the windshield and is provided with a notch 20 for receiving the windshield dividing strip 22. The shelf is connected to the instrument board by means of two springs, generally indicated at 24 and 26, which are connected to legs 12 and 14 and detachably connected to the windshield defrosting vents 28 and 30.

One of the objects of this invention is to provide a detachable shelf mounted on the instrument board of an automobile which is simple, thoroughly practical, and durable in use. Another object is to provide a shelf of the above character which may be easily and quickly mounted on the instrument board of a car without in any way marring the surface of the instrument board or other portions of the car body. Another object is to provide a shelf of the above character which will be sturdy and well able to withstand continuous hard usage. Still another object is to provide a shelf of the above character which when mounted upon the instrument board of an automobile is securely held in position thereon and will not rattle or become loose. A still further object is to provide a shelf of the above character which will be neat and attractive in appearance. Other objects will be in part obvious and in part pointed out hereinafter.

The invention accordingly consists in the features of construction, combinations of elements, and arrangement of parts, as will be exemplified in the structure to be hereinafter described and the scope of the application of which will be indicated in the following claims.

In the accompanying drawings, in which is shown one of the various possible embodiments of this invention, Figure 1 is a perspective view of the instrument board and windshield of an automobile having the detachable shelf mounted thereon;

Figure 2 is a top plan on an enlarged scale of the shelf shown in Figure 1;

Figure 3 is a rear elevation of the shelf shown in Figure 2; and

Figure 4 is a vertical section taken on the line 4—4 of Figure 3, the position of the automobile windshield and the instrument board being indicated by dot and dash lines.

Similar reference characters refer to similar parts throughout the several views of the drawing.

As conducive to a clearer understanding of certain features of this invention, it might here be pointed out that there is no readily accessible place in the modern automobile for the driver or front seat passengers to place articles, such as cigarettes, pipes, sunglasses, change, maps, parkway tickets, small tools, and other articles which the driver may require from time to time during driving. Glove compartments as a rule cannot be used for this purpose because they are usually positioned on the right-hand side of the car where they are inaccessible to the driver. Furthermore, because of the position of glove compartments, it is extremely difficult for the driver to locate an article in the glove compartment and at the same time maintain proper control of the car.

One of the difficulties with detachable shelves now in use lies in the fact that they are secured to the instrument board or other parts of the car by means of screws or bolts. This type of connection is particularly bad because it mars the finish of a car and thus detracts from its resale value. Another difficulty with shelves now in use lies in the fact that they are not reliably secured to the car and thus become loose and either fall off or rattle. It is accordingly another object of this invention to provide a shelf which may be quickly and easily mounted upon the instrument board of a car without marring the finish of the instrument board and which, when secured to the instrument board, cannot fall off or become loose and rattle.

Referring now to the drawings in detail, shelf 10 is flat and has a rib 32 extending upwardly from its rear and side edges which serves to hold articles upon shelf 10. Legs 12 and 14 are similar in construction and are secured to shelf 10 in any suitable manner, such as by screws 34 and 36 (Figure 2). The lower ends of legs 12 and 14 are curved to fit the upper surface of instrument board 16 (Figure 4) and are preferably provided with pads, such as pad 38 on leg 12, which prevent the legs from marring the surface of the instrument board 16.

The forward edge 10a of shelf 10 is shaped to fit the two rearwardly slanting sections 18a and 18b (Figure 1) of the windshield of the car at the juncture point between the windshield and the lower portion of the windshield frame. Because the windshield slants rearwardly, the windshield and frame form a pocket (Figure 4) which prevents the forward portion of shelf 10 from moving upwardly or downwardly when the shelf is pressed forwardly into this pocket as will be fully described hereinafter.

To prevent the shelf from moving longitudinally with respect to instrument board 16, its forward edge 10a is provided with notch 20 (Figure 2), the cross-sectional area of which is equal to the cross-sectional area of the dividing strip 22 (Figure 1) between sections 18a and 18b of the windshield of the car. When the shelf is mounted on the automobile, the dividing strip is positioned in notch 20 and the leading edge 10a of shelf 10 abuts against the two sections 18a and 18b of the windshield.

To hold the shelf in position upon instrument board 16 and to hold the shelf's leading edge 10 in the pocket formed by the lower portion of the windshield and the windshield frame, it is preferably provided with a pair of springs 24 and 26. The rear ends of springs 24 and 26 are connected to legs 12 and 14 in any suitable manner, such as by eyes 40 and 42 and the forward ends of springs 24 and 26 are provided with hooks 44 and 46. When the shelf is mounted upon the car, it is first placed in position upon the instrument board and then the springs 24 and 26 are stretched to permit hooks 44 and 46 to be hooked into the windshield defrosting vents 28 and 30. These springs 24 and 26 exert a resilient pull forwardly and downwardly on legs 12 and 14 and thus hold the shelf in engagement with the windshield of the car and the legs 12 and 14 in contact with the upper surface of the instrument board 16.

Thus it will be seen that a practical and efficient shelf has been described which holds articles required by the driver and passengers in a readily accessible place where the article desired may be selected by the driver without in any way affecting his control of the automobile. The shelf is so constructed that when attached to the car it will be sturdy and well adapted to withstand continuous hard usage without becoming loose or falling off. Furthermore, because of the particular manner in which the shelf is mounted over the instrument board, it is not necessary to mar the finish of a car in any way to secure the shelf in position. It will thus be seen that the several objects hereinabove mentioned as well as many others have been successfully accomplished.

As many possible embodiments may be made of the above invention and as many changes might be made in the embodiment above set forth, it is to be understood that all matter hereinabove set forth or shown in the accompanying drawings is to be interpreted as illustrative and not in a limting sense.

What is claimed is:

1. In a detachable shelf to be mounted upon the instrument board of an automobile, the top surface of said board curving downwardly from the windshield of said automobile, said automobile having windshield defroster vents positioned beneath its windshield, in combination, a shelf having its forward edge shaped to fit the portion of said windshield between said defroster vents and its under surface being shaped to fit the contour of said instrument board with the top surface thereof substantially horizontal, and a pair of springs connected to said shelf at points spaced from said forward edge and detachably connectable to said defroster vents, said springs resiliently urging said shelf against said windshield and against said instrument board.

2. In a detachable shelf to be mounted upon the instrument board of an automobile, the top surface of said board curving downwardly from the windshield of said automobile, said automobile having windshield defroster vents positioned beneath its windshield, in combination, a shelf having its forward edge shaped to fit the portion of said windshield between said defroster vents, under supports secured to said shelf and shaped to fit said top surface of said instrument board with the top surface of said shelf substantially horizontal, and a pair of springs connected respectively to said under supports at points spaced from said forward edge and detachably connectable to said defroster vents, said springs resiliently urging said shelf against said windshield and said under supports against said instrument board.

3. In a shelf to be mounted over the instrument board of an automobile, said automobile having windshield defroster vents positioned beneath said windshield, said windshield being divided into two sections by a center support, in combination, a shelf having its forward edge shaped to fit the portion of the windshield of an automobile between the windshield defroster vents at the juncture point between the windshield and the lower portion of the windshield frame, a pair of legs secured to said shelf and extending downwardly from the rear portion thereof, the lower surfaces of said legs being shaped to fit the upper surface of said instrument board, the center of the forward edge of said shelf having a recess for receiving said center support, and means connected to said shelf at points spaced from said forward edge for connecting said shelf to said defroster vents to hold it against said windshield and said instrument board.

4. In a shelf to be detachably mounted on an automobile over its instrument board, said automobile having a pair of windshield defroster vents positioned beneath its windshield and having a center support dividing its windshield into two sections, in combination, a shelf having its forward edge shaped to fit the portion of the windshield of an automobile between its defroster vents, a pair of legs extending downwardly from the under surface of said shelf to engage the upper surface of said instrument board, the forward edge of said shelf having a recess therein for receiving the center support of said windshield, said recess coacting with said support to prevent said shelf from moving longitudinally with respect to said instrument board, a pair of springs connected to the shelf at points spaced from said forward edge adjacent the sides thereof, said springs being connected to said defroster vents and resiliently urging said shelf against said windshield and said legs against said instrument board.

ALAN BUNCE.

REFERENCES CITED

The following references are of record in the file of this patent:

UNITED STATES PATENTS

| Number | Name | Date |
|---|---|---|
| 1,555,038 | Thweatt | Sept. 29, 1925 |
| 1,580,619 | McGee | Apr. 13, 1926 |
| 1,951,261 | Thompson | Mar. 13, 1934 |
| 2,075,936 | Graebner et al. | Apr. 6, 1937 |
| 2,125,476 | Westrope et al. | Aug. 2, 1938 |
| 2,487,536 | Fiscus | Nov. 8, 1949 |
| 2,494,980 | Zuckerman | Jan. 17, 1950 |
| 2,536,084 | Peters et al. | Jan. 2, 1951 |

FOREIGN PATENTS

| Number | Country | Date |
|---|---|---|
| 434,898 | Great Britain | Sept. 11, 1935 |